(No Model.) 9 Sheets—Sheet 1.

E. N. STEPHENSON.
MACHINE FOR STUFFING MATTRESSES.

No. 544,393. Patented Aug. 13, 1895.

Fig. 1.

Witnesses
John Imini
Linnie Sumby

Inventor
Edwin N. Stephenson.
By James L. Norris
Attorney (No Model.)  9 Sheets—Sheet 8.
E. N. STEPHENSON.
MACHINE FOR STUFFING MATTRESSES.

No. 544,393. Patented Aug. 13, 1895.

UNITED STATES PATENT OFFICE.

EDWIN N. STEPHENSON, OF WACO, TEXAS.

MACHINE FOR STUFFING MATTRESSES.

SPECIFICATION forming part of Letters Patent No. 544,393, dated August 13, 1895.

Application filed May 10, 1895. Serial No. 548,864. (No model.)

*To all whom it may concern:*

Be it known that I, EDWIN N. STEPHENSON, a citizen of the United States, residing at Waco, in the county of McLennan and State of Texas, have invented new and useful Improvements in Machines for Stuffing Mattresses, of which the following is a specification.

My present invention relates to machines for stuffing mattresses, the type of mechanism being substantially the same as that employed in machines for similar purposes which were patented to me upon the 10th day of January, 1888, and the 5th day of March, 1889, Nos. 376,399 and 399,093.

It is the purpose of my present invention to improve the operation and simplify the construction of mechanism of this class, and more particularly to provide a mattress-stuffing machine which shall be practically automatic throughout the series of mechanical steps which constitute the process of stuffing the mattress. With this as the main purpose of my invention it is my further object to provide a construction whereby the same machine may be used to stuff mattresses of different widths, the changes required for this purpose being simple and easily made.

My invention comprises a considerable number of novel features of mechanical construction and new arrangements and combinations of parts, which will be best understood from the following specification, in which said invention will be fully explained, and then particularly pointed out and defined in the claims which follow said specification.

For the purposes of the description reference will be made to the accompanying drawings, in which—

The reference-numeral 1 in the drawings indicates the lower horizontal portions or sills of the machine-frame, from which arise uprights or short vertical posts 2 at suitable intervals, those posts located at the end of the frame being somewhat higher than the intermediate posts. Upon said posts are mounted transverse horizontal beams 3, on which a press-box 4 rests, its bottom and sides being permanent parts of the structure. At one end of the press-box is hinged a top or cover 5 supported upon a transverse bar 6, which is mounted in boxes 7, the latter being secured to the vertical faces of posts 8, one of which stands upon each side of the press-box at its end. Between its ends the bar 6 is also supported by a bearing 9, which forms part of a bracket 10. This bracket is rigidly bolted to an upright brace 12, rising from a longitudinal beam 13, which is arranged near the center of a rectangular structure at the end of the press-box, said structure being comprised between the posts 8 and two similar posts 8ᵃ at the other angles of said structure. The posts 8 and 8ᵃ are extended upward to such a height that the rectangular space inclosed shall be sufficient in horizontal area as well as in height to contain the main portions of the mechanism by which the various parts of the stuffing-machine are operated.

Figure 1:
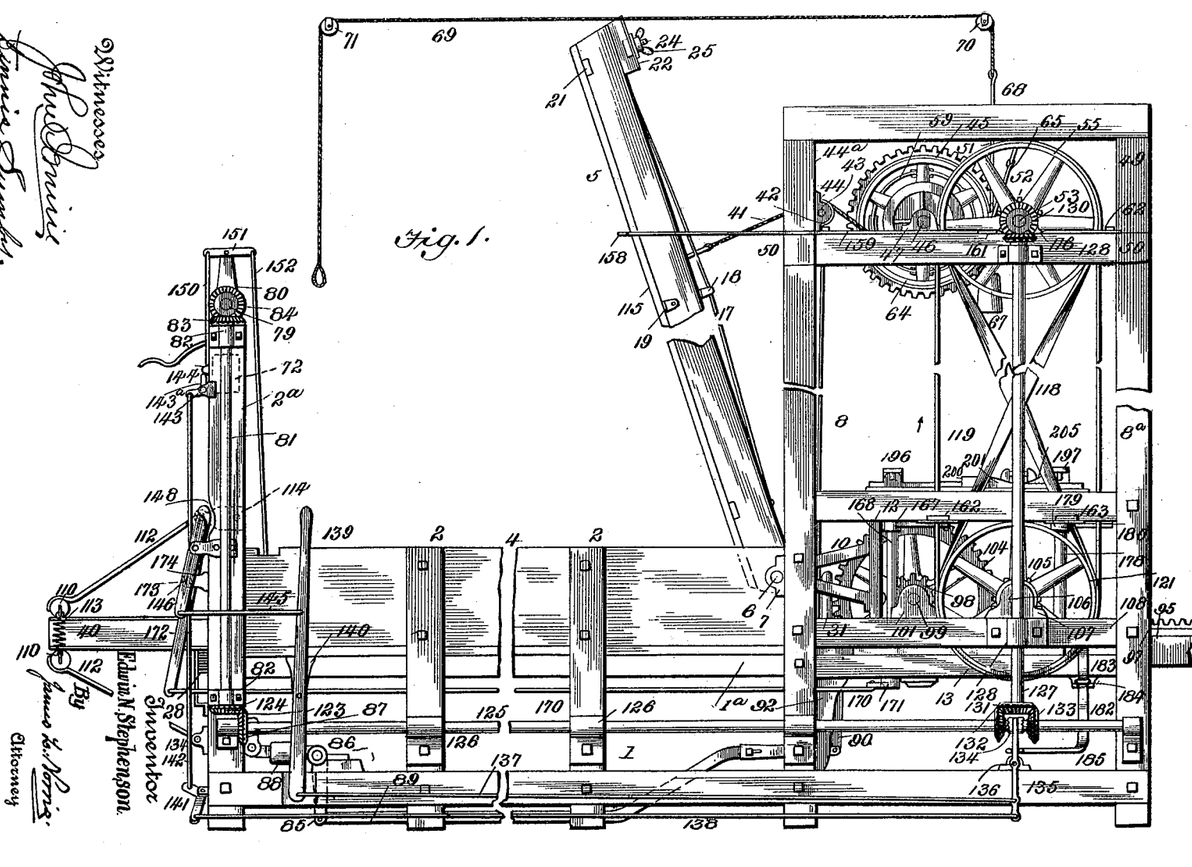
Figure 1 represents a mattress-stuffing machine in side elevation having my invention embodied therein, the intermediate portions of the horizontal and upright frames being broken away to enable the entire machine to be shown in a single figure.

The horizontal sills 1 of the machine-frame are extended to cross the lower ends of the posts 8 and 8ª, to which they are bolted, as seen in Fig. 1. Horizontal beams 1ª are also arranged just beneath the sides of the press-box and bolted at one end to the posts 8. The latter are connected to the posts 8ª by additional braces, both longitudinal and transverse, which, as they also serve as supports for the operating mechanism, will be described hereinafter in connection with said mechanism.

Figure 2:
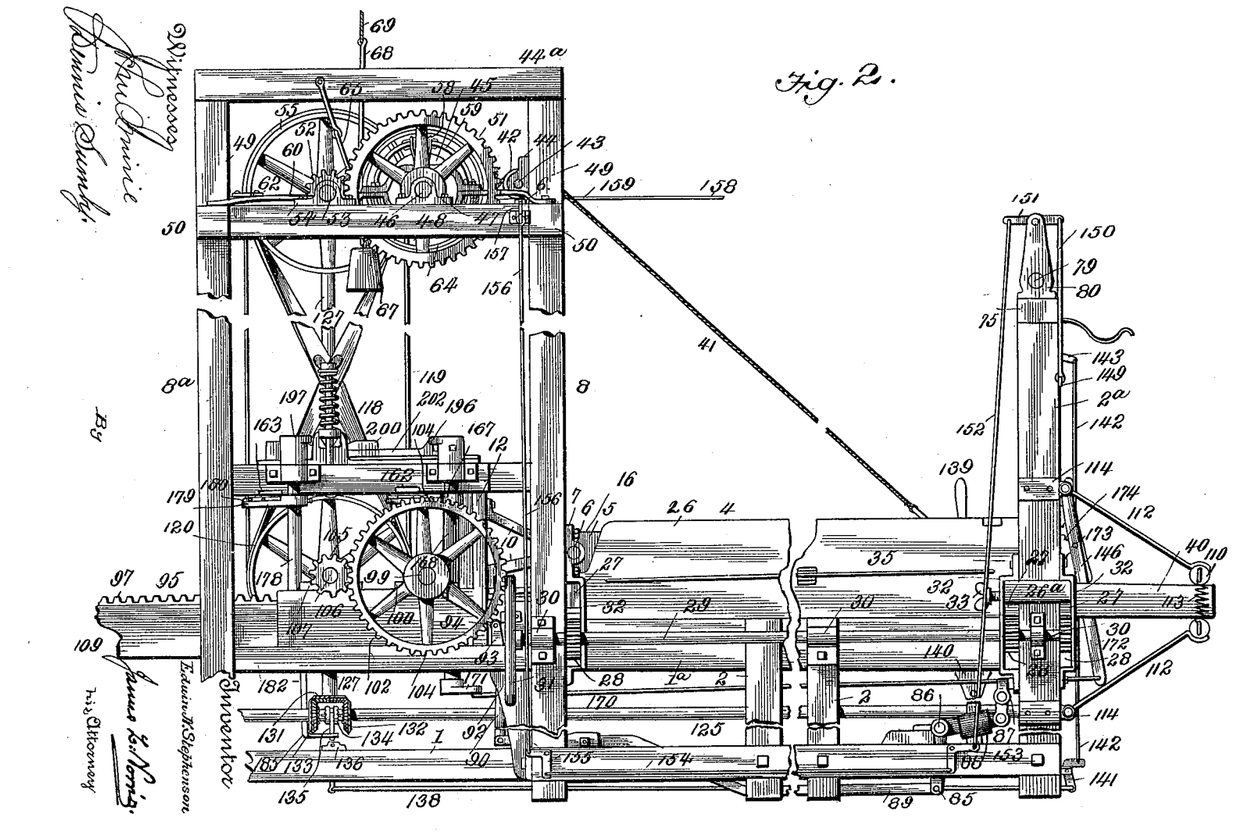
Fig. 2 is a similar side elevation taken from the opposite side of the machine, the cover of the press-box being shown in this figure as lowered, while in Fig. 1 it is raised.
Figure 5:
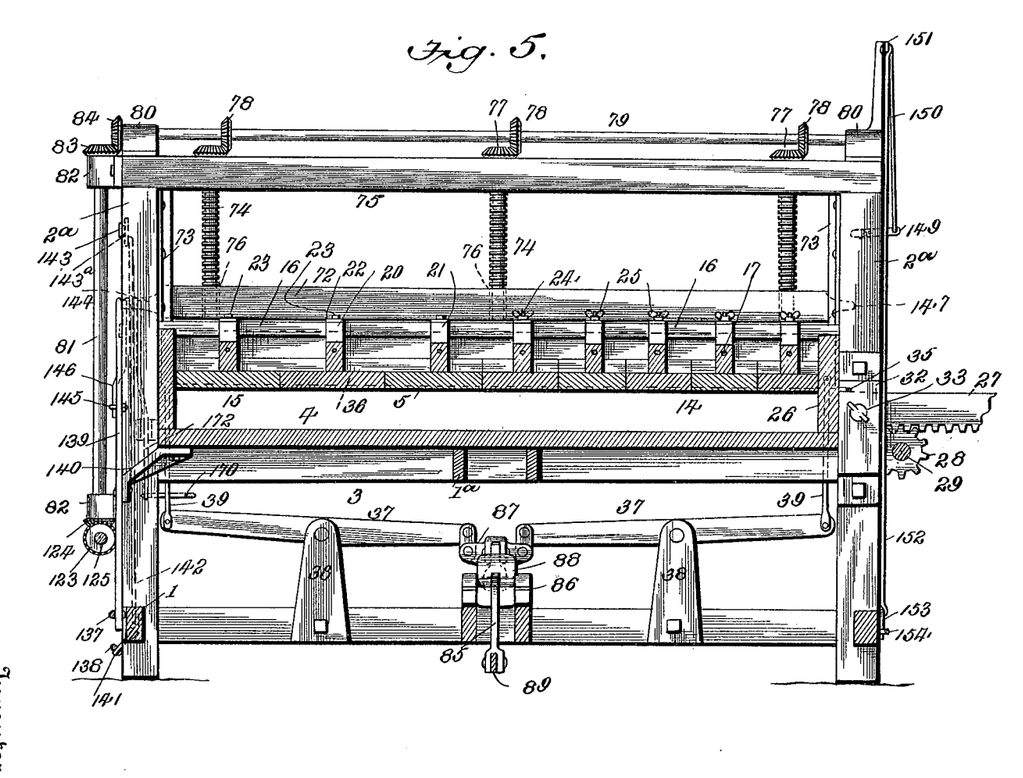
Fig. 5 is a transverse vertical section of the press-box and frame upon the line 5 5, Fig. 6, looking toward the left.

The top or cover of the press-box is composed of a series of longitudinal strips 14 and 15, the strips 15 being preferably of greater width than the strips 14, and being also a permanent part of the structure, while the strips 15 are removable in order to vary the width of the press-box and adapt it to be used for stuffing mattresses of all the different standard widths. Each strip composing the top or cover is provided with a central longitudinal rib 16, and the transverse bar 6 is passed through openings in the ends of said ribs. Trusses 17 are also provided for the strips, their struts 18 being placed on the ribs at or near the centers thereof, and angle-irons 19 are attached at or near the same points to stiffen the ribs, the angle-irons being bolted to the strips and to the vertical ribs. This construction, in conjunction with the trussing of the ribs 16, gives the cover such stiffness and strength as to enable it to resist the bursting strain produced by the action of the plunger upon the material forced from the press-box into the mattress. At the free end of the cover short strips 20 are mounted on the ends of the ribs 16, and in the upper edges of these strips are formed recesses, in which a transverse bar 12 is seated, its upper face being flush with the edges of said ribs. This bar extends from side to side of the press-box near the free end of the cover, and it is confined in the recesses in the strips 20 by means of metallic strips 22, which overlie the upper faces of said strips, to which their ends are secured by screws 23. The removable or separable strips 15 are connected to the transverse brace-bar 21 by bolts 24, which pass up through the strips 20 and bar 21 and have thumb-nuts 25 turned upon their upper ends. In order to vary the width of the press-box to make it correspond to the different standard widths of mattresses, one of the side walls 26, Fig. 5, is rendered laterally adjustable by the following means:

To the outer face of the side wall 26, at or near each of its ends, is rigidly attached a horizontal outwardly-projecting rack-bar 27, its teeth being on the lower edge and meshing with a pinion 28, carried by a shaft 29, Fig. 2, which has support in boxes 30, bolted to the uprights 2ª and to one of the posts 8. The shaft 29 is parallel with the side wall and lies in a plane a little below its lower edge. One end extends somewhat beyond the post 8 and receives a hand-wheel 31, by which the shaft is operated in either direction, thereby drawing the rack-bars 27 out or in, said bars having guidance in keepers 32, Fig. 2. Upon the forward end of the shaft the pinion 28 is duplicated, one being placed on each side of the post 2ª, and two rack-bars 27 are provided to mesh with said pinions, the outer ends of said rack-bars being connected by a bar 26ª, Figs. 2 and 3. A set-screw 33 is threaded through the keeper 32 and has friction bearing at its end against the rack-bar 27, and by turning this screw up with a suitable force the rack-bar will be clamped and rigidly held from moving in either direction, and as the shaft 29 is also locked by this means the rack-bar 27 at the other end of said shaft will be held immovable by its mesh with the pinion 28. When the side wall 26 is adjusted to the proper point it can be rigidly held at said point by the means described until any desired number of mattresses are stuffed. The side wall 26 is provided with a truss-brace 35 upon its exterior face similar in construction to the trusses upon the strips forming the top or cover. The open forward end of the press-box is closed up to a certain point in the operative stroke of the plunger in order to effect a certain compression of the excelsior or other material with which the mattress is filled before it is pushed into the tick. The press-box is then opened automatically to permit the compressed material to pass into the tick. This opening and closing is effected by means of a gate 36, which is raised and lowered to open and close the end of the box, respectively, by means of duplicate levers 37, Fig. 5, fulcrumed upon upright brackets 38 and connected to the ends of the gate by link-rods 39. The means for automatically operating these levers at the proper time will be described at another point.

Figure 6:
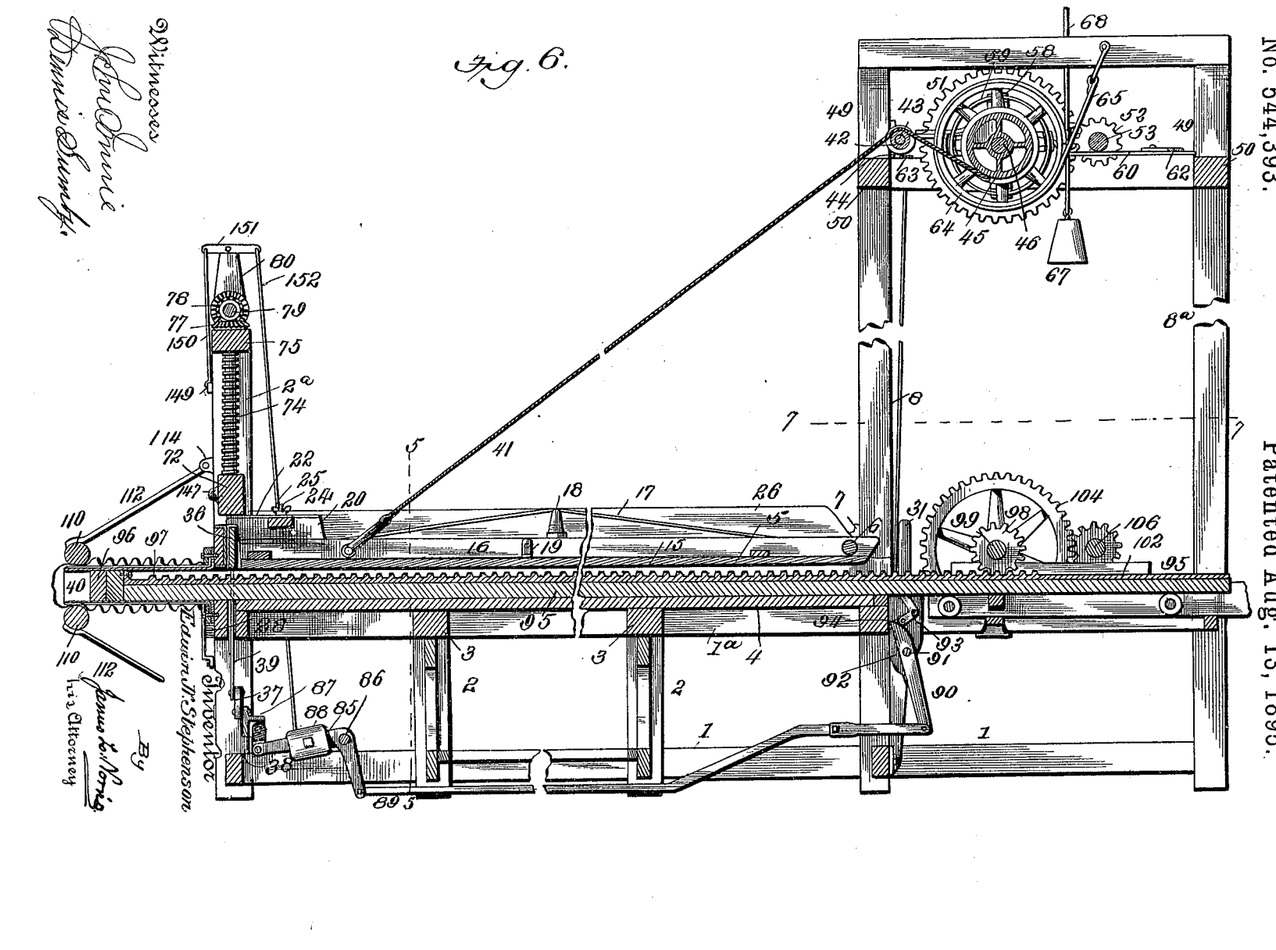
Fig. 6 is a vertical longitudinal section taken in substantially a central line.

At the front end of the press-box and supported upon the machine-frame is a spout 40 corresponding in interior dimensions with the interior of the press-box, and so arranged that the plunger may pass without obstruction from the box into the spout, and vice versa, the space inclosed by the spout and box being continuous and uninterrupted, as shown in Fig. 6, the gate 36 being arranged to move vertically between the outer end of the press-box and the inner end of the spout. The plunger moves in making its effective stroke through or so far through the length of the spout as to push all the stuffing into the tick. The confined space within which it moves is inclosed for the greater part of the length of the stroke by the top or cover, which is raised after each operation and then lowered and locked in its lowered position before each forward movement of the plunger. The means by which said cover is raised, lowered, and locked, or the mechanism by which it is rigidly held in its lowered position to resist the bursting strain produced by the compression of the plunger upon the material in the press-box, will now be described.

Figure 10:
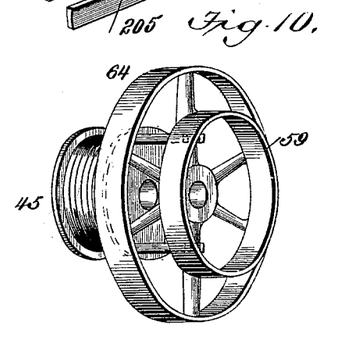
Fig. 10 is a detail perspective of the windlass, the friction-pulley, and one member of the friction-clutch.

The hinged top or cover is raised and lowered by a cable 41, connected to the cover at or near its free end, Fig. 6. From the point of attachment the rope is carried upward and rearward and over a roll or pulley 42, which is carried by a shaft 43, mounted in boxes 44 upon a frame 44ª, rising above the upper portions of the posts 8. From the roll or pulley 42 the cable 41 is carried to the drum 45 of a windlass, said drum being rotated by a shaft 46, journaled in boxes 47, one of the latter being supported upon a horizontal beam 48, extending between the posts 8 and 8ª, and serving as a brace to stiffen and support said posts, and the other box upon a parallel beam 48ª, which lies beneath one of the beams 44ª. By the movement of this drum in one direction or the other the top or cover of the press-box is lowered and raised at such times as are required by the operation of the other parts. The frame 44ª is composed of two parallel beams, each denoted by said reference-numeral 44ª, and each supported by short uprights 49, the latter rising from horizontal beams 50, one of which connects the two posts 8 and the other the two posts 8ª at the top of the frame, said beams 50 being transverse to the longitudinal line of the machine. The shaft 46 carrying the drum 45 is provided with a large spur-gear 51, which is driven by a small pinion 52, the latter being carried by a power-shaft 53, which is journaled in boxes 54 upon the two beams 48. This shaft is provided with a wide pulley 55 equal in width to three separate pulleys on the countershaft below, Figs. 3 and 4. The manner in which this pulley is belted to the countershaft and the mode of operation will be explained after I have described the mechanism for operating the windlass to raise and lower the cover of the press-box and for operating the plunger. Upon the shaft 46, carrying the drum 45, is keyed a friction-clutch 58, which may be engaged with and disengaged from a friction-pulley 59 loosely mounted on the shaft 46. The friction-pulley is shown in detail in Fig. 10, in which it is positively connected to the drum 45. The friction-clutch 58 is of any suitable or preferred form, the only condition required being that it shall be capable of frictional engagement with the clutch-pulley 59 at such times as the said clutch may be thrown into operative engagement by a lever-arm 60, Fig. 3, which is pivoted at one end to the transverse beam 50 connecting the posts 8. This lever-arm is arranged to swing in a horizontal plane and is moved in opposite directions by a link-rod 62, connected to its end, or at a point near its end. As the drum 45 is required to be wholly automatic in practice in raising the cover, and as its automatic action must be timed with relation to the operation of other parts, I will now proceed to describe the means by which the operation of the rope-drum is accomplished.

In lowering the cover of the press-box to the position shown in Fig. 6 it is desirable to provide means whereby the cable 41 may be paid off from the drum 45 with suitable speed and the cover lowered by its own gravity without causing shock or injury to the other parts of the mechanism. For this purpose I rigidly mount upon the shaft 46, which carries the drum 45, a friction-pulley 64, and around said pulley I carry a friction band or strap 65, formed of any suitable material capable of exerting friction upon the surface of said pulley 64. This friction-band is attached to one of the beams 44ª, and is then carried around or over said friction-pulley 64 in the same direction in which the pulley revolves in order to lower the cover. To the end of said band, which is extended a little below the point where it leaves the cylindrical face of the pulley, is secured a weight 67 of suitable size, the gravity thereof serving to draw the friction-band 65 closely around the pulley 64 and create such a degree of friction thereon as will not only cause the drum 45 to rotate with a moderate speed in paying off the cable 41 to lower the cover, but will, when the full amount of friction is exerted, wholly arrest the revolution of the drum and check the pay-off of the cable, by which the cover will be held motionless at any point in its upward or downward movement, or at the cessation of its upward movement, when it is substantially in the position indicated in Fig. 1 of the drawings. In order to lower said cover, it is only necessary to remove or lessen the frictional contact between the band 65 and the friction-pulley 64, which may be done by merely exerting an upward draft or pull upon the weight 67, which is secured to the end of said band. To enable the operator to do this conveniently, I attach to the weighted end of the band 65 a strap 68, which is connected to a cord 69, the latter being carried upward and over a guide-pulley 70 on the ceiling, and thence to a second and similar pulley 71, from which the cord hangs within convenient reach of the attendant or operator, who usually stands at or near the forward end of the machine. By drawing upon this cord the tension upon the friction-band, which is caused by the draft of the weight, is so far relieved as to allow the cover to cause its descent, the rapidity of its movement being regulated by the pull upon the cord, by means of which a greater or less frictional retardation is exerted by the friction-band 65 upon the friction-pulley over which said band is drawn. It will be understood, of course, that when the cable 41 is paid off from the windlass 45 the friction-clutch is out of engagement with the parts connected to said windlass.

Figures 12, 13, 14, 15, 16:
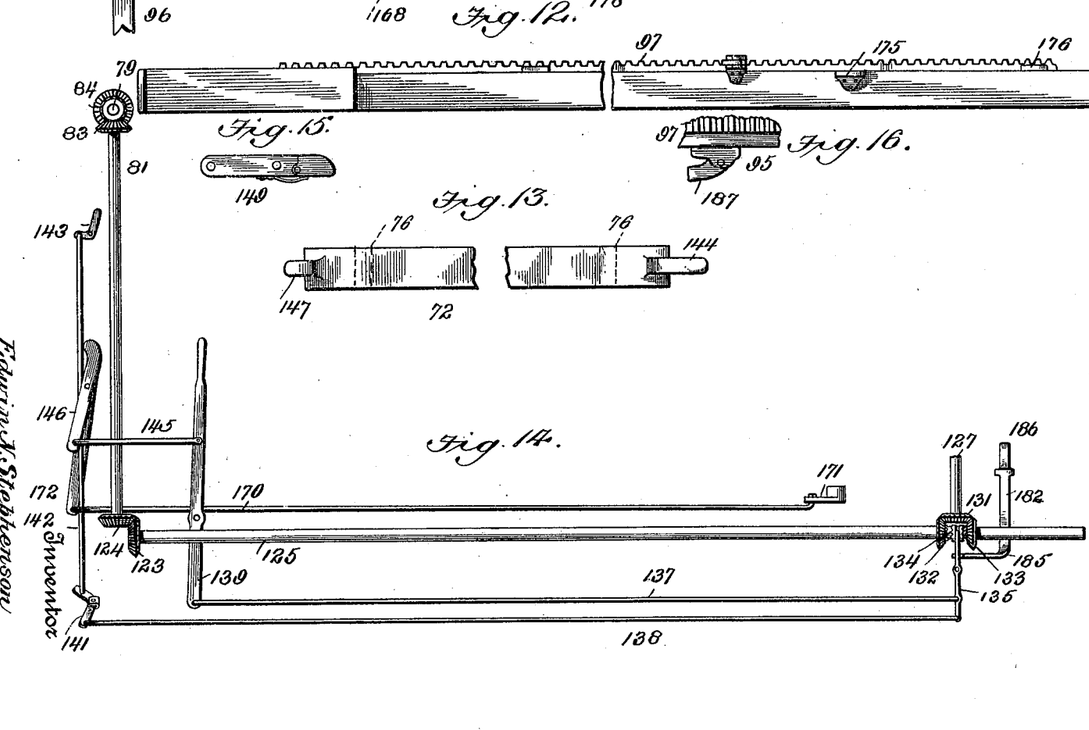
Fig. 12 is a side elevation of the same.
Fig. 13 is a detail plan view of the end portion of the presser-bar.
Fig. 14 is a diagrammatic side elevation of the parts controlling the clutch and belt-shifter by which the action of the machine is initiated and arrested.
Fig. 15 is a detail view of the latch-lever by which the belt-shifter is operated to reverse the mechanism moving the plunger and retract the same.
Fig. 16 is a detail view of a small portion of the plunger-bar, showing the spring-operated latch-lug mounted thereon.

When the top or cover is lowered into the position shown in Fig. 6 its free end is supported against the interior compression exerted by the plunger by a presser-bar 72. This bar, which is shown in detail in Fig. 13, extends between posts 2ᵃ at the forward end of the machine, its ends lying in and being guided by vertical channels 73 on the inner faces of said posts. In these vertical channels the presser-bar is raised and lowered by means of screw-threaded shafts 74, swiveled in a horizontal transverse beam 75, Fig. 5, the lower ends of said shafts being engaged with threaded apertures 76 in the presser-bar, as seen in Figs. 5 and 13, in both of which said apertures are shown in dotted lines. The threaded shafts 74 are revolved by means of bevel-gears 77, mounted upon the upper ends of said shafts above the beam 75 and meshing with bevel-gears 78, which are carried by a shaft 79, journaled in boxes 80 on the upper ends of the posts 2ᵃ. When lowered to the position shown in Fig. 6 the presser-bar rests upon the forward ends of the short strips 20, which are superimposed upon the longitudinal ribs or strips 16. Any required pressure may be exerted by the screw-threaded shafts 74, but all that is required is to bring the presser-bar 72 into position to receive the lift of the cover caused by the action of the plunger upon the stuffing material contained in the press-box. The shaft 79 is operated by a vertical shaft 81, Fig. 3, supported in boxes 82 on the vertical outer face of one of the posts 2ᵃ. Said vertical shaft is provided with a beveled gear 83, which meshes with a similar gear 84 on one end of the shaft 79. The mechanism by which the presser-bar is operated automatically will be described in detail in a subsequent part of this specification.

Figure 3:
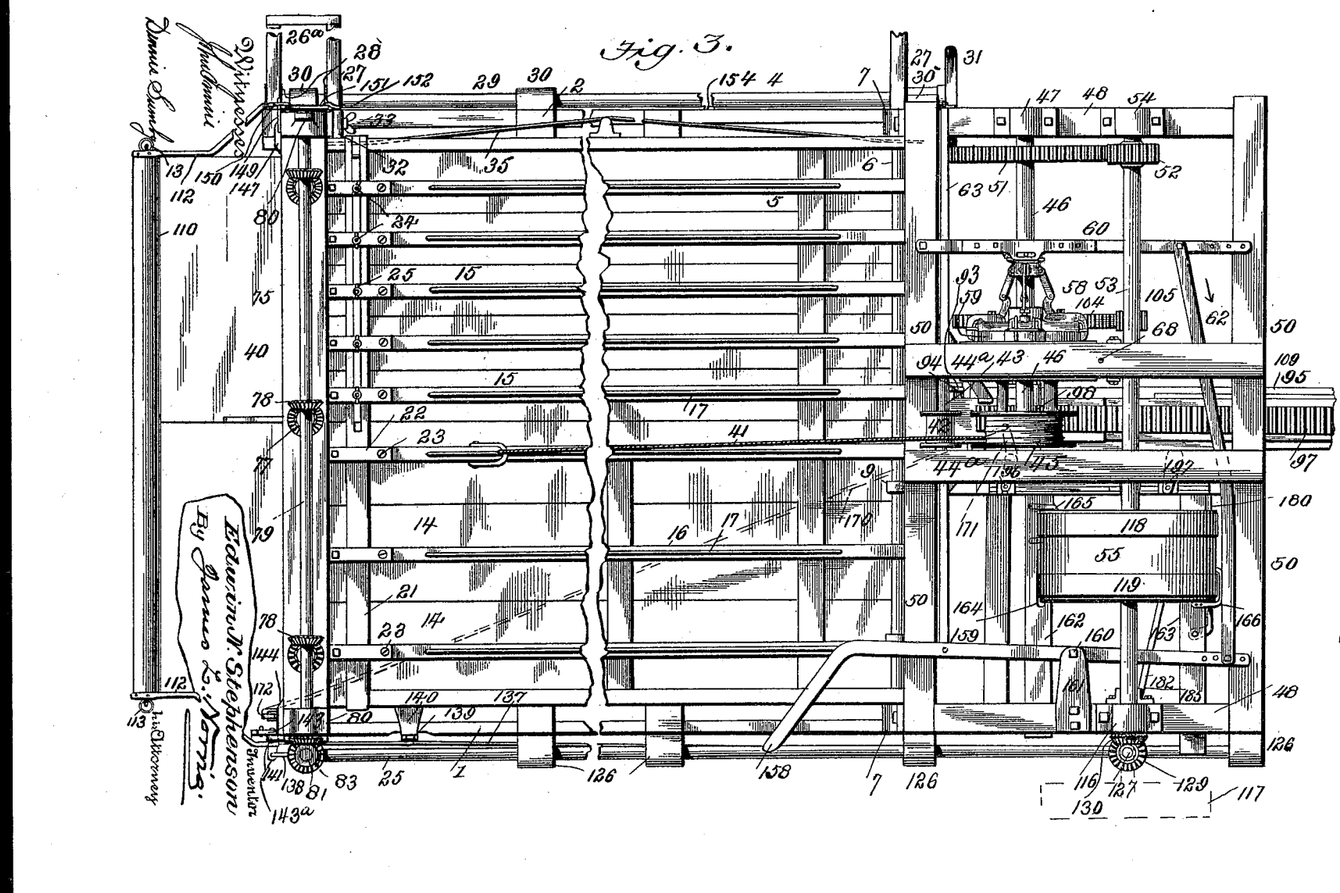
Fig. 3 is a plan view of the mattress-stuffing machine.
Figure 7:
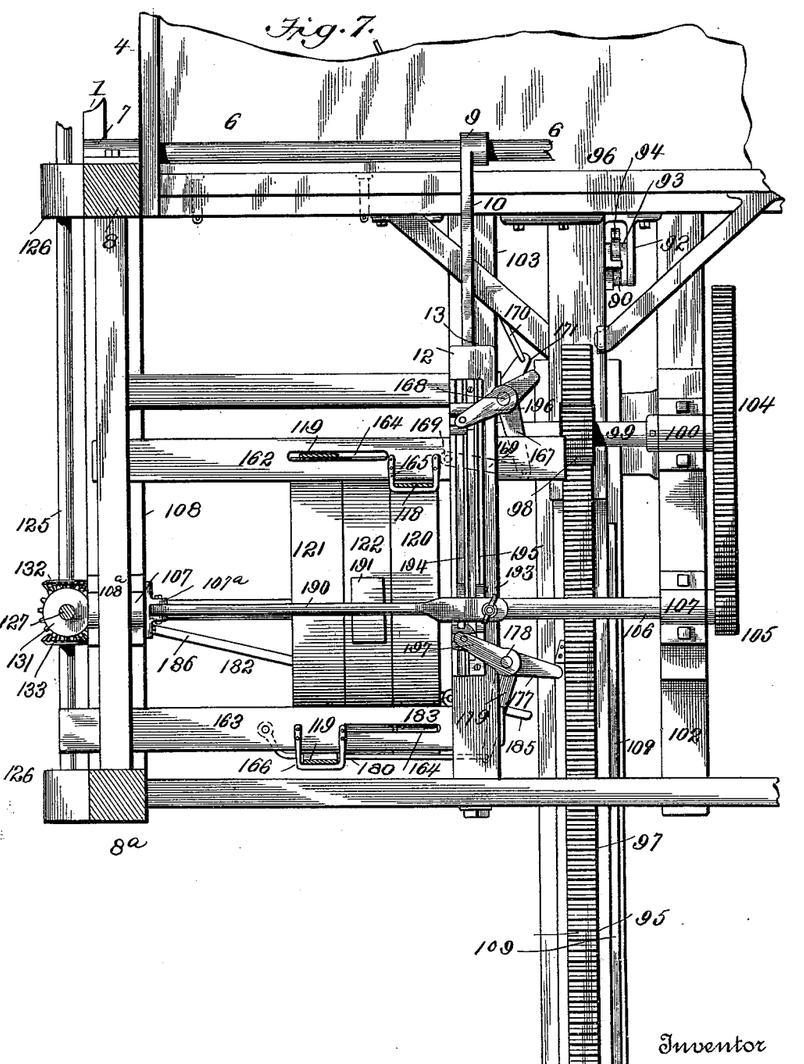
Fig. 7 is a horizontal section taken substantially in the dotted line 7 7 in Fig. 6, the parts below being shown in plan.
Figure 11:
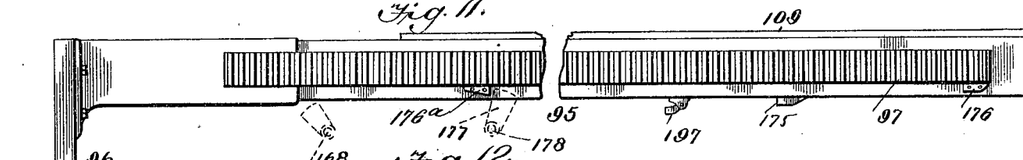
Fig. 11 is a detail plan view of the plunger-bar, an intermediate portion being broken away to reduce the length of the illustration.

Between the spout 40 and the open forward end of the press-box is arranged the gate 36, as already described, operated by the link-rods 39, by which said gate is raised and lowered in a narrow space provided for it between the spout and press-box. The levers 37, by which the gate 36 is caused to close the mouth of the press-box and then open the same, are operated by a bell-crank or elbow lever 85, having a fulcrum 86, which lies substantially in the central longitudinal line of the machine. The end of this lever is connected by a cross-head 87 straddled thereon to the levers 37, and between the fulcrum 86 and the cross-head 87 a weight 88 is mounted on the long arm of the bell-crank lever 85, by the gravity of which the gate 36 is partly, but not wholly, counterbalanced, the weight of said gate serving to hold the same in front of the mouth of the press-box, as in Fig. 5. This being the normal position of said gate, in which it is held by its own gravity, the levers 37 and 85 are operated to raise said gate and open the mouth of the press-box by means of the following mechanism:

The arm of the bell-crank or elbow lever 85 is extended from its fulcrum 86 downward nearly in a vertical line. To its end is pivotally connected a rod 89, which is extended beneath the machine-frame to the rearward part of the press-box. Its rearward end is inclined upward and rearward, and is linked to the lower end of a trip-lever 90, which is mounted on a horizontal fulcrum 91, lying between two vertical plates 92, Figs. 6 and 7, arranged at the rear of and below the bottom of the press-box upon the right-hand side of the median longitudinal line of said box. Between the vertical plates 92 is also mounted an angular cam 93, having antifriction-rolls 94 journaled on the ends of its arms. One of these rolls lies normally against the beveled or inclined rearward edge of the lever 90 above its fulcrum 91. The other roll 94 lies above the upper ends of the vertical plates 92 and upon one side of the plunger-bar 95. The plunger-bar lies substantially in the median longitudinal line of the machine, as shown in Fig. 3, and is of such length that it may carry the plunger-head 96 from the extreme rearward end of the press-box into the spout far enough to drive the compressed stuffing material out of the press-box and into the tick. It is provided for this purpose with a rack-bar 97 upon its upper face, said rack being meshed with a pinion 98, carried by a shaft 99. This shaft is supported in boxes 100 and 101, Figs. 1 and 7, mounted on horizontal beams 102 and 103, which lie on opposite sides of the plunger-bar, Figs. 4 and 7. The shaft 99 has a large spur-gear 104, which is driven to operate the plunger by means of a pinion 105, which is keyed upon the end of a shaft 106. This shaft has bearing in boxes 107, two on the beams 102 and 103, and the third on a parallel beam 108, extending between the posts 8 and 8ᵃ at the left hand of the machine-frame, Fig. 7. The mechanism by which the shaft is rotated first in one direction and then in the other will be explained in its order. Upon the side of the plunger-bar adjacent to the angular cam 93 is formed or mounted a cam-rib 109, Figs. 7 and 11, the forward end of which is located in rear of the forward end of the rack 97, but in the same plane with the end of the angular cam 93, which rises above the vertical plates 92 and stands in the line of movement followed by the cam-rib 109. By this arrangement the plunger moves forward a certain distance before the cam-rib has any action upon the angular cam 93. During this time the gate 36 remains closed, and the plunger-head 96, therefore, has a compressing action upon the excelsior or other material used for stuffing the mattress. The compression is thus effected in the press-box, and all the strain required in bringing the material to a required density is exerted upon the walls of said box and not upon the tick, which is not calculated to withstand such strains and would, in nearly all cases, be likely to tear or burst open if subjected to it. By the mechanism described, however, the stuffing is compressed to any degree in the press-box, and when this compression is effected the gate 36 is lifted by the engagement of the cam-rib 109 with the angular cam 93 and the entire mass of compressed stuffing material is pushed smoothly into the tick, which is filled to the exact degree required by the expansion of the compressed mass, which takes place after it passes out of the press-box. The gate 36 remains open or is sustained by the levers 37 until the plunger finishes its stroke, as shown in Fig. 6, and has been retracted to such a point that the cam-rib 109 passes off the angular cam 93. At the instant this takes place the gravity of the weight 88 operates the bell-crank lever 85 and through it the levers 37, whereby the gate 36 is dropped and the end of the box closed in readiness for another operation.

The tick is drawn loosely over the exterior of the spout 40, as seen in Fig. 6, and is gathered thereupon in folds or plaits to bring its closed end up to the mouth of said spout, or substantially so. As the excelsior, hair, or other stuffing is pushed into said tick, the latter is drawn off the spout, a suitable degree of tension being imparted by means of press-rolls 110, which are mounted upon the ends of pivoted arms 112, and drawn against the outer faces of the spout by springs 113, Fig. 1. The arms 112 are pivotally connected to brackets 114, mounted upon the posts $2^a$, Figs. 1, 2, and 6.

The mechanism thus far explained is driven by or from the power-shaft 53, arranged in the upper portion of the frame comprising the posts 8 and $8^a$, said shaft being supported in boxes 54 and 116, which are arranged upon the two side beams 48, which connect the upper ends of the posts 8 with the posts $8^a$. Upon one end, which projects outside the limits of said frame, is mounted the power-pulley 117, Fig. 4, which is belted to any preferred source of power. The power-shaft carries a single pulley 55, having its face of a width substantially equal to three separate pulleys on the countershaft, as fully explained hereinafter. The single side pulley is connected by a crossed belt 118 and a straight belt 119 to two pulleys 120 and 121, Fig. 7, which are upon the countershaft 106, directly beneath the shaft 53. Between said pulleys is a live pulley 122, the two pulleys 120 and 121 being loose upon the shaft. It is evident that by shifting the two belts 118 and 119 alternately from the loose pulleys to the central live pulley the countershaft 106 will receive revolution in opposite directions successively, and thus a complete reciprocation may be given to the plunger-bar 95.

The vertical shaft 81 at the forward end of the press-box, which operates the shaft 79 to raise and lower the presser-bar 72, is driven by bevel-gears 123 and 124 from a long horizontal shaft 125, Fig. 1. This shaft lies in boxes 126, bolted to the uprights 2 $2^a$ and to the posts 8 and $8^a$. In vertical line with the power-shaft 53 is a vertical shaft 127, supported in boxes 128, bolted to the outer faces of one of the beams 48 and 108. It is provided with a bevel-gear 129, Figs. 1, 3, and 4, meshing with a like gear 130 on the power-shaft. On its lower end is a bevel-gear 131, lying between and meshing with two bevel-gears 132 and 133, both of which are loose on the shaft 125. Between these gears is a double clutch 134, splined upon the shaft and capable of movement by which it may be locked with either one of the bevel-gears 132 or 133. This movement of the clutch is made by means of a clutch-lever 135 having its fulcrum on a bracket 136. To the lower end of this lever are attached two connecting-rods 137 and 138, the former extending along the bottom of the frame to a hand-lever 139, which has its fulcrum upon a depending bracket 140 near the forward end of the press-box. The other rod 138 is extended in the same direction to the end of the frame and connected to one arm of a bell-crank 141, pivoted to a bracket on the end face of one of the posts $2^a$. The other arm of this bell-crank is connected by a rod 142 to one arm of a bell-crank 143, which is pivoted upon a bracket $143^a$, secured to the post $2^a$ at a little distance below its upper end, its pivotal axis being at such a point that when the double clutch is in mesh with the gear 133 one arm of the bell-crank 143 will be in the line of movement of a lug 144 on the end of the presser-bar 72, Figs. 3 and 13. As the latter rises by the operation of the threaded shafts 74, the lug 144 will engage said arm just an instant before the presser-bar reaches its highest position, and by rocking the bell-crank 143 it will operate the clutch-lever 135 and bring the clutch to a position between the two bevel-gears 132 133 and out of engagement with both. This position of the parts is shown in Fig. 1. This operation immediately arrests the action of the shafts 125 and 81, as well as the parts which raise the presser-bar.

When the cover is lowered to the position shown in Fig. 6, the hand-lever 139 must necessarily be operated by the attendant in order to initiate the action of the mechanism by which the presser-bar 72 is lowered. To arrest this mechanism, when the presser-bar is lowered to the proper point, I connect the hand-lever 139 by means of a rod 145 to the lower end of a lever 146, having a fulcrum upon the post $2^a$ at the left-hand side of the machine-frame. The upper end of this lever is rounded and is placed in the line of movement of the lug 144, Figs. 3 and 13, on the end of the presser-bar 72, a recess 148 being formed in the post $2^a$, Fig. 1, in order to bring the end of the lever within the maximum range of movement of the lug. The lever 146 is so located that the lug 144 will operate it at the moment when the presser-bar reaches its lowest adjustment. The movement produced by said lug 144 produces sufficient movement in the lever to enable it to swing the hand-lever 139 and restore the double clutch to the position shown in Fig. 1.

When the presser-bar has risen to a suitable height, it is desirable that the windlass 45 be automatically brought into operation to lift the cover of the press-box to the position shown in Fig. 1. To accomplish this without manual intervention, I mount upon the post 2ª, at the right-hand side of the machine, a straight lever 149, one end of which lies in the path of a lug 147 on the end of the presser-bar 72 as the latter rises. The location of said lever is such that it will be operated by the presser-bar as the latter approaches its highest position. Said lever is connected by a rod 150 to one end of a straight lever 151, fulcrumed on the top of the post 2ª. The other end of said lever is connected by a substantially vertical rod 152 to the end of the horizontal arm of a bell-crank or angular lever 153, Fig. 2, pivoted on the right side of the frame. The depending arm of said bell-crank is connected by a rod 154, which extends along the lower part of the frame to a second and similar bell-crank 155, pivotally mounted on the lower part of the post 8 on the same side of the machine. The horizontal arm of said bell-crank 155 is connected by a vertical rod 156 to the horizontal arm of another bell-crank 157, Figs. 3 and 4, which turns in a vertical plane, its other arm being connected by the link-rod 63 with the lever 159, which releases the friction-clutch 58 by which the windlass 45 is operated to lift the top or cover. As the latter reaches its highest elevation its edge impinges upon the angular arm 158 of said lever 159, Fig. 3, which has its fulcrum 160 on a bracket 161, projecting from the beam 48 at the left hand of the frame. The rear end of this lever is connected by the link-rod 62 to the lever 60, and by its movement the friction-clutch 58 is removed from operative engagement and the action of the windlass 45 ceases. The top is sustained in its raised position by means of the friction-strap 65.

The belts 118 and 119 are shifted by the following mechanism: Upon each side of the shaft 106 is arranged a belt-shifter parallel with the axis of said shaft. One of these shifters is indicated by the numeral 162 and the other by the numeral 163. Each has an elongated slot 164, through which one of the belts passes, the slot being of such length that the shifter may be adjusted without affecting the belt lying in said slot. Each belt-shifter is also provided with a loop or keeper, the numeral 165 denoting the one upon the belt-shifter 162 and 166 that upon the shifter 163. The belt 118 lies in the former and 119 in the latter. The belt-shifter 162 is operated by an arm 167 upon a vertical rock-shaft 168, said arm being connected to the shifting-bar by a link-rod 169, Fig. 7. The rock-shaft is operated through a connecting-rod 170, attached to an arm 171 on said rock-shaft and extending thence beneath the press-box, Fig. 1, to the forward end of the machine, where it is connected to the lower end of a lever 172. This lever has its fulcrum 173 upon a bracket 174, projecting from the front face of the left-hand post 2ª, Figs. 2 and 3. Its upper end approaches the face of said post that it may lie in the path of the lug on the presser-bar, said lug being a little longer than the lug upon the opposite end of the presser-bar. This action takes place upon the downward movement of the presser-bar 72 and as the latter reaches its lowest position. By it the belt 118 is thrown upon the live pulley 122, thereby setting the shaft 106 in motion, communicating movement to the shaft 99 and driving the plunger forward into the press-box. By this turn of the rock-shaft 168 an arm 171, rigid on said shaft, is turned into the path of a lug on the plunger-bar 95, Figs. 11 and 12, said lug being so located that it engages the arm 171 just as the plunger completes its forward movement. This lug turns the rock-shaft 168 and operates the belt-shifter 162 in such manner as to carry the belt 118 from the live pulley 122 back upon the dead or loose pulley 120. At the same moment a lug 176 at the end of the rack on the plunger-bar engages an arm 177 on a rock-shaft 178, the latter having an arm 179 connected by a link 180 to the belt-shifter 163. By this action the straight belt 119 is shifted from the loose pulley 121 to the live pulley 122, and the shaft 106 is again set in motion, but in the opposite direction, whereby the plunger-bar is retracted. As its backward movement is completed a lug 176ª, at a suitable distance from the forward end of the rack-bar 97, engages said arm 177 and moves the rock-shaft, so as to restore the belt 119 to the dead pulley 121 and arrest the movement of the plunger.

Figure 4:
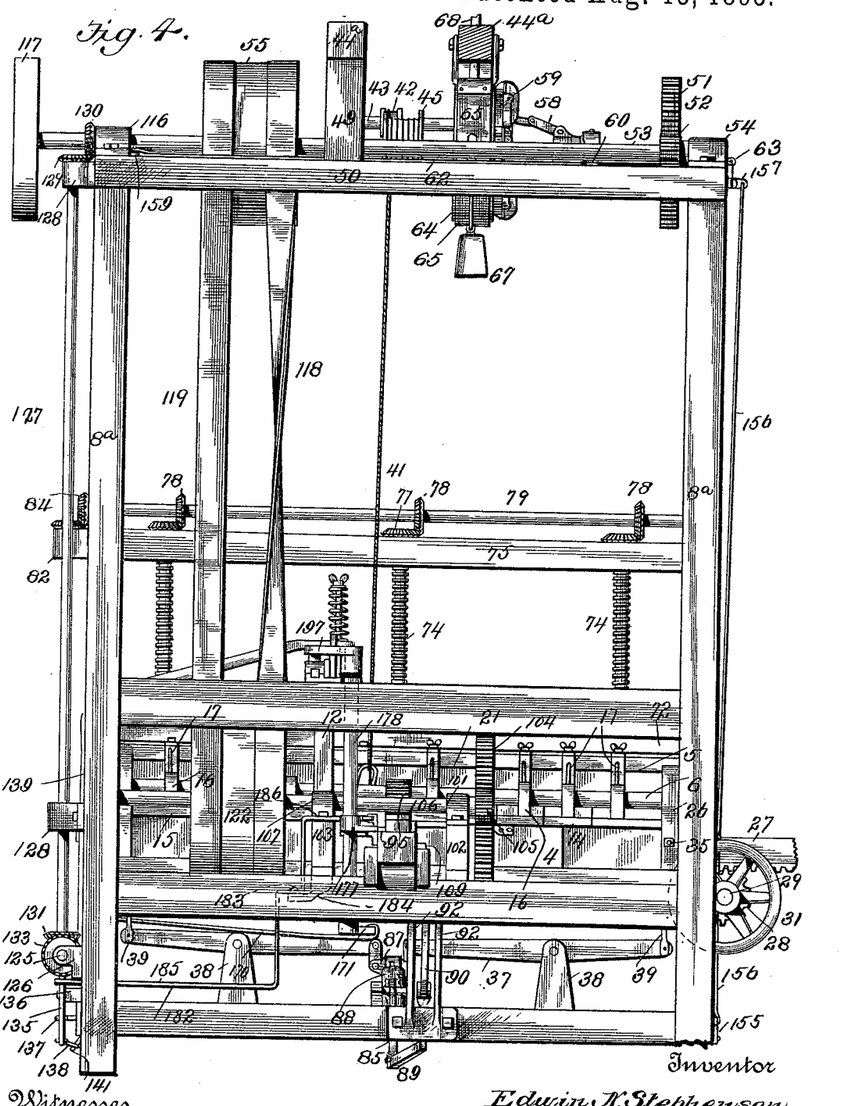
Fig. 4 is a rear end elevation of the same.

At the rear of the machine, Fig. 4, is arranged a lever 182, having a fulcrum 183 on a bracket 184. Said lever is bent above and below its pivotal support to form horizontal arms 186 and 185, the former, which lies on one side the fulcrum, having its end in the path of a cam-lug 187 on the plunger-bar 95, Fig. 16, where it is pivoted to a bracket and held in position by a spring. The construction, which is of any familiar form, is such that the cam-lug will pass the arm 186 on the backward movement of the plunger-bar without acting, but on the forward movement it swings said arm in the direction of movement of the plunger and thus throws the arm 185 in the other direction. The latter arm has a loose connection to the clutch-lever 135. This operation shifts the clutch 134, since the plunger having completed its effective stroke and being about to move back the presser-bar must rise and the cover then be lifted. As some short period is necessary for the screw-shafts 74 to raise the presser-bar, the lever 182 is operated by the last part of the forward movement of the plunger, and the clutch 134 is thus shipped in engagement with the bevel-gear 131, whereby the shafts 125 and 81 are set in motion. As the presser-bar 72 rises to its highest point, it not only unships the clutch 134, as already described, but by also actuating the straight levers 149 and 151, and through the connecting-rod 152, bell-crank 153, rod 154, bell-crank 155, rod 156, bell-crank 157, and the connecting-bar 63, the friction-clutch 58 is shipped or engaged with its drum 59, and by the same movement the releasing-lever 159 is swung into such position that its angular end lies in the path of the left-hand side of the cover as the latter rises. The remaining steps in the operation have been fully described heretofore.

In view of the weight of the parts and the momentum which may be produced I have considered it advisable to provide a friction-brake for the live pulley 122. This brake is automatically applied and removed and consists of the following parts:

Pivoted upon a bracket 107$^a$ upon a side brace 108$^a$ is a lever 190, which carries a brake-shoe 191, adapted to bear upon the central or live pulley 122 when its action is required. The opposite end of said lever has an aperture or eye which admits a vertical rigid spindle 192, rising from a longitudinally-arranged beam 193, said spindle extending some distance above the beam and having a pressure-spring 194 coiled thereon. A thumb-screw 194$^a$ is provided to bear upon the end of said spring and adjust its tension-bearing.

It will be observed that the vertically-movable end of the bar 190 crosses the beam or support 193. In said beam are formed channels 195 and 195$^a$ parallel with each other and with the length of the beam 193, which furnishes support for the boxes giving bearing to the upper ends of the rock-shafts 168 and 178. Upon the upper ends of said rock-shafts are arms 196 and 197, the former being upon the rock-shaft 168 and the latter upon the rock-shaft 178. The end of the arm 197 has a pin 198, which engages a notched bracket 199 at the end of a slide 200, Fig. 9, which lies in the channel 195, the other end of said slide being provided with a beveled rising edge 201, which may, by the turn of the rock-shaft 178, be driven under the end of the lever 190 and caused to raise the same and lift the brake-shoe 191. In the other channel 195 is arranged a longer slide 202, having a notch 203, which is engaged by a pin 204 on the end of the arm 196, whereby the longer slide 202 is moved in parallelism with the slide 200. The slide 202 is provided with a beveled edge 205 acting in a direction opposite to that of the beveled edge 201.

Figures 8, 9:
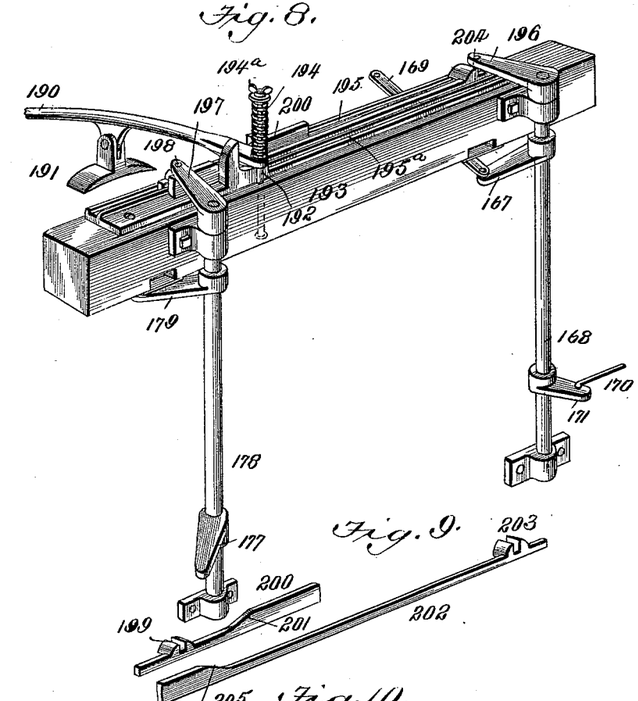
Fig. 8 is a detail perspective of the mechanism which automatically applies and removes the friction-shoe to and from the live pulley on the countershaft.
Fig. 9 is a detail perspective of the slides forming part of the mechanism shown in Fig. 8.

By referring to Figs. 8 and 9 it will be noted that the movement of the slides 200 and 202 in the same direction will normally have the effect of momentarily dropping and immediately lifting the lever 190 and brake-shoe 191, whereby the latter will have no effect upon the pulley 122. As the action of the brake-shoe is only required upon the live pulley 122 at the moment intervening between the two opposite movements of the live pulley 122, by which the plunger-bar 95 is reciprocated, the period of its frictional engagement with the face of the pulley is comparatively short, but, by the mechanism described, this period is amply sufficient to quickly arrest the motion of the pulley and enable it to draw back the plunger-bar after the latter has fully completed its stroke.

What I claim is—

1. In a machine for stuffing mattresses, the combination with a press-box, of a hinged top, a rope and rope-drum to raise and lower the same, a clutch on the shaft of the rope-drum, a plunger movable in the press-box, means for operating said plunger by power derived from the shaft of the rope-drum, two independent belt-shifters acting upon a straight and a crossed belt which connect pulleys on said drum-shaft with similar pulleys on a shaft between it and the plunger-bar, devices for operating said belt-shifters, and a lever and cam-lug, the former actuated by an automatically adjusted part of the machine, and the latter by a cam-lug on the plunger-bar, substantially as described.

2. In a machine for stuffing mattresses, the combination with a press-box, of a hinged top, means for lowering and raising the same, a presser-bar vertically adjustable over the end of the lowered top, threaded shafts to effect said adjustment, a power-shaft, a shaft having pulleys belted thereto by a straight and a crossed belt, two separate belt-shifters to shift either belt from its loose pulley to a central tight pulley, a plunger movable in the press-box, a lever operated by a cam-finger on the presser-bar to shift one belt to the tight pulley, and cam-lugs on the bar of the plunger to return said belt to its loose pulley and to throw the other belt upon the tight pulley, substantially as described.

3. In a machine for stuffing mattresses, the combination with a press-box, of a hinged cover, raising and lowering mechanism, a power-shaft operating the same, a plunger and plunger-bar, the latter having a rack bar thereon, a shaft carrying a gear meshing with said rack, a shaft belted to the power-shaft by a straight and a crossed belt, independent belt-shifters to shift said belts from loose pulleys to a tight pulley, a presser-bar, a lever operated by a cam-lug on said presser-bar to throw one of the belts on the tight pulley, a gate normally closing the mouth of the press-box, a weighted lever connected to said gate, an angular cam to operate the latter lever, a cam-rib on the plunger-bar to operate the angular cam, and cam-lugs to operate the belt-shifters and reverse the movement of the plunger, substantially as described.

4. In a machine for stuffing mattresses, the combination with a press-box, of a hinged top, a drum loose on a power-shaft to raise and lower said top, a clutch to lock said drum to the shaft, and a lever operated by the hinged top to release said clutch when the top is raised to its highest point, substantially as described.

5. In a machine for stuffing mattresses, the combination with a press-box, of a plunger movable therein, mechanism for operating said plunger, a rising and falling gate to close the mouth of the press-box, means for operating said gate, a plunger-bar having a lateral cam-rib terminating short of its forward end, and an angular cam and a lever operated thereby, said cam having an arm lying in the path of the rib on the plunger-bar, substantially as described.

6. In a machine for stuffing mattresses, the combination with a press-box, of a hinged top, a presser-bar vertically movable over the end of said top when lowered, mechanism for raising and lowering said presser-bar, a shaft operating said mechanism, a shaft belted to the power-shaft by a straight and a crossed belt, a clutch on the shaft operating the presser-bar, a belt-shifter controlling one of said belts, a plunger movable in the press-box and provided with means for operating said belt-shifter, and a lever operated by a cam-finger on the presser-bar to actuate the clutch on the presser-bar shaft, substantially as described.

7. In a machine for stuffing mattresses, the combination with a press-box, of a plunger movable therein and having a plunger-bar provided with a lateral cam-rib terminating short of its forward end, a gate normally closing the mouth of the press-box, a weighted lever partly balancing the gate, a lever connected to said weighted lever, and an angular cam having one arm lying in the path of the lateral cam-rib on the plunger-bar and the other arm acting upon the end of the lever which operates the weighted lever, substantially as described.

8. In a mattress-stuffing machine, the combination with a press-box, of a hinged cover, a plunger and plunger-bar, a gate normally closing the mouth of the box and opened by a weighted lever, a lever connected to said weighted lever to open the gate, and an angular cam operating said lever by a lateral cam-rib on the plunger-bar, the forward end of said rib being located in rear of the forward end of the plunger-bar, whereby the latter may compress the stuffing material in the press-box before the gate is opened, substantially as described.

9. In a mattress-stuffing machine, the combination with a press-box, of a hinged cover, a presser-bar to fasten its free end, threaded shafts to raise and lower said presser-bar, a series of shafts geared to each other to operate the threaded shafts, one of the series being provided with a beveled gear two beveled gears permanently meshed therewith both being loose on another shaft, a clutch splined on the latter shaft between the loose bevel-gears, a clutch-operating lever, and disengaging lever fulcrumed upon the front end of the machine in the path of a lug on the end of the presser-bar, substantially as described.

10. In a mattress-stuffing machine, the combination with a press-box, of a gate normally closed by its own gravity at the mouth of the box, a plunger movable in said box, the plunger-bar having a cam-rib on one side, and levers connected to the gate and adapted to be operated to lift said gate by means of the cam-rib, which makes its operative engagement after the plunger has advanced far enough in the box to suitably compress and shape the stuffing material, substantially as described.

11. In a mattress-stuffing machine, the combination with a press-box, of a gate normally closing the mouth of said box by its own gravity, a plunger movable in the box, the plunger-bar being provided with a cam-rib extending from the rearward end of said bar to a point between the center and forward end of the same, gate-levers adapted to lift the gate and open the mouth of the press-box, and a series of levers connected to said gate-levers and to each other, the last lever of the series being so arranged as to be operated by the cam-rib to lift the gate after the plunger has effected a suitable compression of the stuffing material, substantially as described.

12. In a mattress-stuffing machine, the combination with a press-box, of a gate movable vertically and normally closing the front end of the press-box, a plunger movable in said box, a pair of gate levers connected to the ends of the gate and to one arm of the bell-crank lever, a second lever connected at one end to the other arm of said bell-crank lever, and an angular cam adapted to operate said second lever and to be itself operated by a cam-rib on the plunger-bar extending from its rearward end to a point between its center and forward end, whereby the gate remains closed until the forward movement of the plunger shall have compressed and shaped the stuffing material in the press-box, substantially as described.

13. In a mattress-stuffing machine, the combination with a press-box, of a hinged top or cover, a presser-bar, screw-shafts to raise and lower the same, a driving-shaft geared to the power-shaft a clutch on one of the shafts and a lever connected to said clutch the end of said lever lying in the path of a lug on one end of the presser-bar to arrest the downward movement of the latter, substantially as described.

In testimony whereof I have hereunto set my hand in presence of two subscribing witnesses.

EDWIN N. STEPHENSON.

Witnesses:
T. H. WOODWORTH,
R. L. VERNON.